United States Patent
Sankaralingam et al.

(10) Patent No.: US 11,048,661 B2
(45) Date of Patent: Jun. 29, 2021

(54) SYSTEMS AND METHODS FOR STREAM-DATAFLOW ACCELERATION WHEREIN A DELAY IS IMPLEMENTED SO AS TO EQUALIZE ARRIVAL TIMES OF DATA PACKETS AT A DESTINATION FUNCTIONAL UNIT

(71) Applicant: SimpleMachines Inc., Madison, WI (US)

(72) Inventors: Karthikeyan Sankaralingam, Madison, WI (US); Anthony Nowatzki, Los Angeles, CA (US); Vinay Gangadhar, Madison, WI (US); Preyas Shah, Madison, WI (US); Newsha Ardalani, Santa Clara, CA (US)

(73) Assignee: SIMPLE MACHINES INC., Madison, WI (US)

( * ) Notice: Subject to any disclaimer, the term of this patent is extended or adjusted under 35 U.S.C. 154(b) by 0 days.

(21) Appl. No.: 16/384,819

(22) Filed: Apr. 15, 2019

(65) Prior Publication Data

US 2019/0317770 A1    Oct. 17, 2019

Related U.S. Application Data

(60) Provisional application No. 62/658,561, filed on Apr. 16, 2018.

(51) Int. Cl.
*G06F 15/82*    (2006.01)
(52) U.S. Cl.
CPC .................................. *G06F 15/825* (2013.01)

(58) Field of Classification Search
CPC ..................................................... G06F 15/825
See application file for complete search history.

(56) References Cited

U.S. PATENT DOCUMENTS

| | | | |
|---|---|---|---|
| 2004/0267857 A1* | 12/2004 | Abel | G06F 7/5338 708/524 |
| 2009/0070552 A1 | 3/2009 | Kanstein et al. | |
| 2018/0101387 A1 | 4/2018 | Etsion et al. | |
| 2018/0196908 A1 | 7/2018 | Bannow | |
| 2018/0210730 A1 | 7/2018 | Sankaralingam et al. | |
| 2019/0004995 A1 | 1/2019 | Sankaralingam et al. | |

FOREIGN PATENT DOCUMENTS

KR            101293700 B1        8/2013

OTHER PUBLICATIONS

Gangadhar et al. (Gangadhar) (An Efficient Architectural Realization of a Specialization Engine for Neural Networks With General-Purpose Programmability); 21 pages (Year: 2015).*

(Continued)

*Primary Examiner* — Keith E Vicary

(57) ABSTRACT

A dataflow accelerator including a control/command core, a scratchpad and a coarse grain reconfigurable array (CGRA) according to an exemplary embodiment is disclosed. The scratchpad may include a write controller to transmit data to an input vector port interface and to receive data from the input vector port interface. The CGRA may receive data from the input vector port interface and includes a plurality of interconnects and a plurality of functional units.

19 Claims, 9 Drawing Sheets

(56) References Cited

OTHER PUBLICATIONS

T. Nowatzki, V. Gangadhan, K. Sankaralingam and G. Wright, "Pushing the limits of accelerator efficiency while retaining programmability," 2016 IEEE International Symposium on High Performance Computer Architecture (HPCA), Barcelona, pp. 27-39. (Year: 2016).*

Gangadhar et al. (Gangadhar) (An Efficient Architectural Realization of a Specialization Engine for Neural Networks With General-Purpose Programmability); 22 pages (Year: 2015).*

Tony Nowatzki et al. A general constraint-centric scheduling framework for spatial architectures. In Proceedings of the 34th ACM SIGPLAN Conference on Programming Language Design and Implementation (PLDI '13). 12 pages. (Year: 2013).*

O. Moreira, M. Popp, and C. Schulz, "Evolutionary Acyclic Graph Partitioning," arXiv preprint arXiv:1709.08563, [Online]. Available: http://arxiv.org/abs/1709.08563—Published Sep. 2017; 15 pages (Year: 2017).*

Anonymous Author (s), Hybrid Optimization/Stochastic Instruction Scheduling for Programmable Accelerators, CGO, 2018, 12 pgs.

Tony Nowatzki et al., Stream-Dataflow Acceleration, Jun. 24-28, 2017, Toronto, ON, Canada, 14 pgs., http://research.cs.wisc.edu/vertical/papers/2017/isca17-stream-dataflow.pdf.

Anonymous Author (s), Draft, Hybrid Optimization/Stochastic Instruction Scheduling for Programmable Accelerators, CGO, 2018, 12 pgs, published as Tony Nowatzki et al., Hybrid Optimization/Heuristic Instruction Scheduling for Programmable Accelerator Codesign, PACT '18, Nov. 1-4, 2018, Limassol, Cyprus, 15 pgs.

Qadeer et al., Convolution Engine: Balancing Efficiency and Flexibility in Specialized Computing, Communications of the ACM, Apr. 2015, vol. 58, No. 4, pp. 85-93.

Liu et al., PuDianNao: A Polyvalent Machine Learning Accelerator, ASPLOS, Mar. 2015, pp. 369-381, Istanbul, Turkey.

* cited by examiner

```
input : Computation Graph G, Hardware Graph H
output : Schedule S
1  list = RandomTopologicalSort(G)
2  for v ∈ list do
3  |    best_routing = Nill
4  |    if do_rand_pick() then
5  |    |    while (!success && attempt_more()) do
6  |    |    |    n = randompick(CompatibleNodesLeft(v,S))
7  |    |    |    success = RouteInEdges(v,n,cur_routing)
8  |    |    end
9  |    |    if success then best_routing = cur_routing
10 |    else
11 |    |    for n ∈ CompatibleNodesLeft(v,S) do
12 |    |    |    cur_routing = Nill
13 |    |    |    success = RouteInEdges(v,n, cur_routing) if
                      success then best_routing = cur_routing
14 |    |    end
15 |    end
16 |    if best_routing == Nill then return Nill
17 |    else IncorporateRouting(S,best_routing)
18 end
19 Procedure RouteInEdges(v, n, cur_routing)
   |    input :Vertex v, Node n, Routing cur_routing
   |    output :Update cur_routing
20 |    success = true
21 |    for e ∈ IncomingEdges(v) do
22 |    |    success &&= ShortestPath(e,n,cur_routing,H)
23 |    |    && Score(cur_routing) < Score(best_routing)
24 |    |    if !success then break
25 |    end
26 |    return success
```

FIG. 8

900 ↘ input : Computation Graph $G$, Hardware Graph $H$
    output : Schedule $S$
1  best_schedule=Nill, i=0
2  while *keep_going(++i,best_schedule)* do
3     new_schedule = ScheduleGraph($G, H$)
4     FixTiming(new_schedule)
5     if *score(new_schedule) < score(best_schedule)* then
6         best_schedule = new_schedule
7     end
8 end

910 ↘ input : Computation Graph $G$, Hardware Graph $H$
    output : Schedule *best_schedule*
1 while *keep_going(best_schedule)* do
2     heur_schedule=ScheduleIterative(G,H)
3     new_schedule=MILPSchedule(G,H,heur_schedule)
4     if *score(new_schedule) < score(best_schedule)* then
5         best_schedule = new_schedule
6     end
7 end

*FIG. 9*

SYSTEMS AND METHODS FOR STREAM-DATAFLOW ACCELERATION WHEREIN A DELAY IS IMPLEMENTED SO AS TO EQUALIZE ARRIVAL TIMES OF DATA PACKETS AT A DESTINATION FUNCTIONAL UNIT

CROSS-REFERENCE TO RELATED APPLICATIONS

This application claims the benefit of U.S. Provisional Patent Application No. 62/658,561 filed Apr. 16, 2018 and incorporated herein by reference in its entirety.

BACKGROUND

In computing systems, there is always a tradeoff between performance of a processor and power consumption of the processor. Computing systems, and their associated processors, have become physically smaller but are required to have increased processing speed and performance. To overcome the issue of needing an increase in power in order to provide increased performance, Domain Specific Accelerators (DSAs) have been developed. While DSAs sacrifice programmability for efficiency and are capable of more efficient performance than conventional processors, DSAs are limited in the domain in which they perform. For example, a DSA may be limited to a specific type of application (e.g., graphics processing).

Another accelerator alternative is a field-programmable gate array (FPGA) which is an integrated circuit that may be configured by a user to be used as an accelerator. An FPGA may provide computation and communication resources that can be configured, or programmed, at load time or run time. For example, the functionality of an FPGA can be specified by a configuration file that is loaded at power-up and the configuration file will control the operation of a system. However, while being programmable, an FPGA typically requires more overhead and has less power efficiency than a DSA.

A coarse grain reconfigurable array (CGRA) includes an array of a large number of function units (FUs) interconnected by a mesh style network. Register files are distributed throughout the CGRAs to hold temporary values and are accessible only by a subset of functional units. In contrast to FPGAs, CGRAs are much more efficient from a hardware perspective but lack configurability because mapping applications onto a CGRA is difficult.

It would therefore be desirable to provide a programmable accelerator that accesses memory efficiently and is capable of increased performance but is not limited to a specific domain.

BRIEF DESCRIPTION OF THE EXEMPLARY EMBODIMENTS

Some embodiments described herein relate to a stream dataflow accelerator. The stream dataflow accelerator may comprise a control core, a plurality of stream engines to receive commands from the control core, and a CGRA to receive data from the plurality of stream engines.

Some embodiments described herein relate to a method of flow control through a CGRA, the method comprising: receiving data from a plurality of stream engines at a CGRA including a plurality of interconnects and a plurality of functional units; delaying the received data to control flow through the CGRA; processing the data via the functional units; and outputting a result to a plurality of output vector ports.

Some embodiments described herein relate to a non-transitory computer-readable medium comprising processor executable instructions that when executed by a processor perform a method of flow control through a CGRA, the method comprising: receiving data from a plurality of stream engines at a CGRA including a plurality of interconnects and a plurality of functional units; delaying the received data to control flow through the CGRA; processing the data via the functional units; and outputting a result to a plurality of output vector ports.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 8 illustrates sample code in accordance with some embodiments; and,

FIG. 9 illustrates sample code in accordance with some embodiments.

Figure 1:
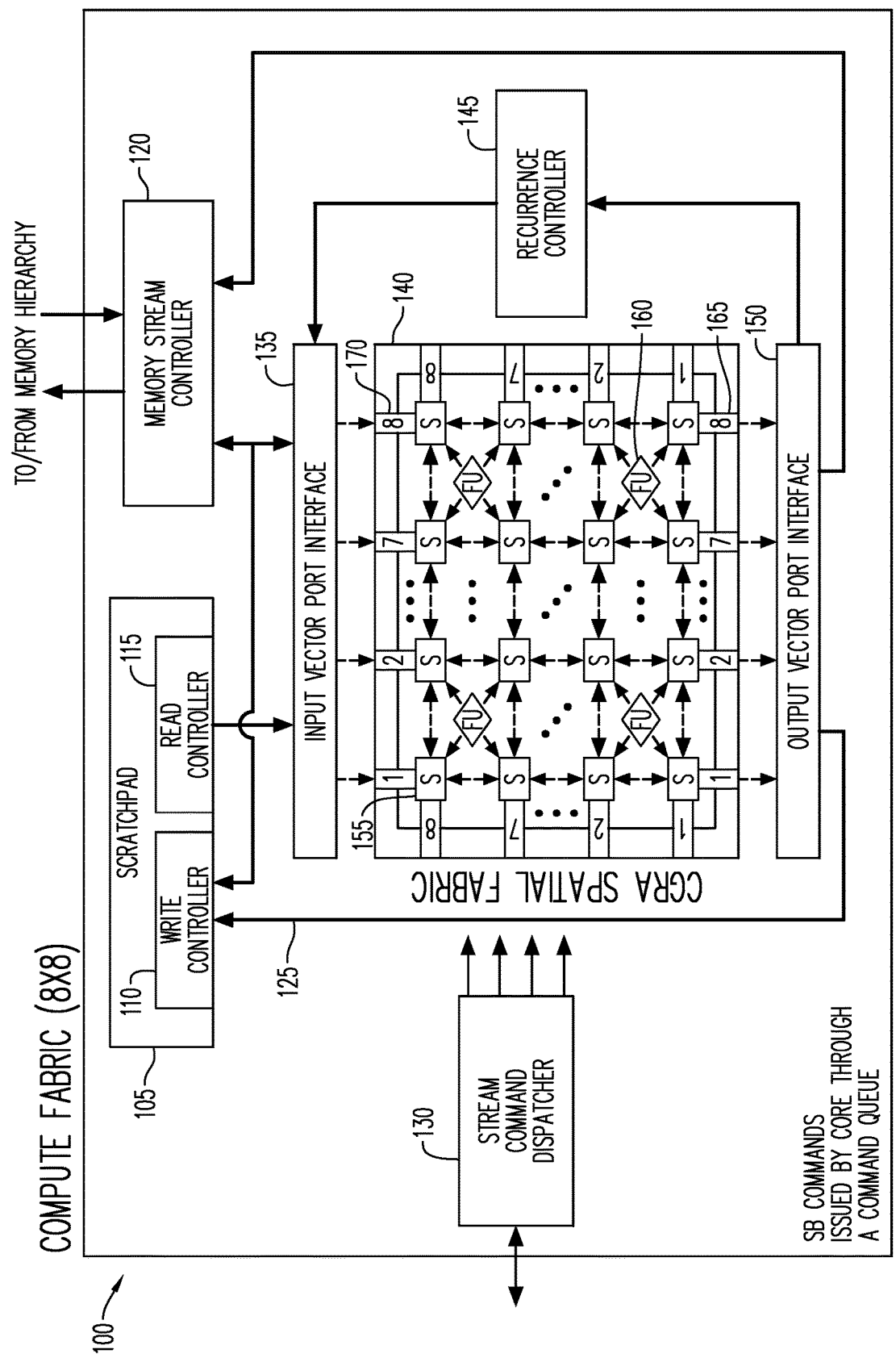
FIG. 1 illustrates a dataflow accelerator in accordance with some embodiments.

Various features, aspects, and advantages of the embodiments will become more apparent from the following detailed description, along with the accompanying figures in which like numerals represent like components throughout the figures and text. The various described features are not necessarily drawn to scale but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments. In the following detailed description, numerous specific details are set forth in order to provide a thorough understanding of the embodiments. However, the embodiments may be practiced without these specific details. In other instances, well-known methods, procedures, components and circuits have not been described in detail so as not to obscure the embodiments.

The present embodiments relate to a system and method associated with a course-grained reconfigurable architecture (CGRA) to be used as part of a dataflow accelerator. A CGRA may be used to significantly reduce the performance gaps associated with DSAs and FPGAs while maintaining ease of programming and efficiency of power. In particular, the embodiments described herein may relate to controlling a flow of data through a CGRA by delaying the transmission of data into the CGRA or within the CGRA itself. Using a delay to control the flow of data may allow a dataflow accelerator to function more efficiently.

Now referring to FIG. 1, an embodiment of a dataflow accelerator 100 is illustrated. The dataflow accelerator 100 may comprise a plurality of stream engines such as, but not limited to, scratchpad 105, memory stream controller 120 and the recurrence controller 145. Each stream engine may send and/or receive data into a CGRA 140.

The scratchpad 105 may function as an address space to collect and access re-used data. The scratchpad 105 may comprise a write controller 110 for writing data to the scratchpad 105. The scratchpad 105 may further comprise a read controller 115 for transmitting data from the scratchpad 105 to the CGRA 140. The memory stream controller 120 may send and receive data between system memory of a computing system (not shown in FIG. 1) and the CGRA 140. The recurrence controller 145 may receive data from the CGRA and send data to the CGRA 140 (e.g., for reuse of data). For example, an input vector port interface 135 may receive data from, e.g., the scratchpad 105, the memory stream controller 120, and the recurrence controller 145 and input the various data into the CGRA 140 and an output vector port interface 150 may receive results that were output from the CGRA 140 (e.g., result data). In some embodiments, the result data may be reused as part of iterative processing. The input vector port interface 135 may receive data from the scratchpad 105, the memory stream controller 120 and the recurrence controller 145. The input vector port interface 135 may also receive one or more stream commands from a stream command dispatcher 130 via the scratchpad 105. The output vector port interface 150 may receive results from the CGRA 140 such as calculations based on the data input at the input vector port interface 135. The data received at the output vector port interface 150 may be transmitted to the recurrence controller 145 and/or provided by input 125 to the scratchpad 105.

Figure 6:
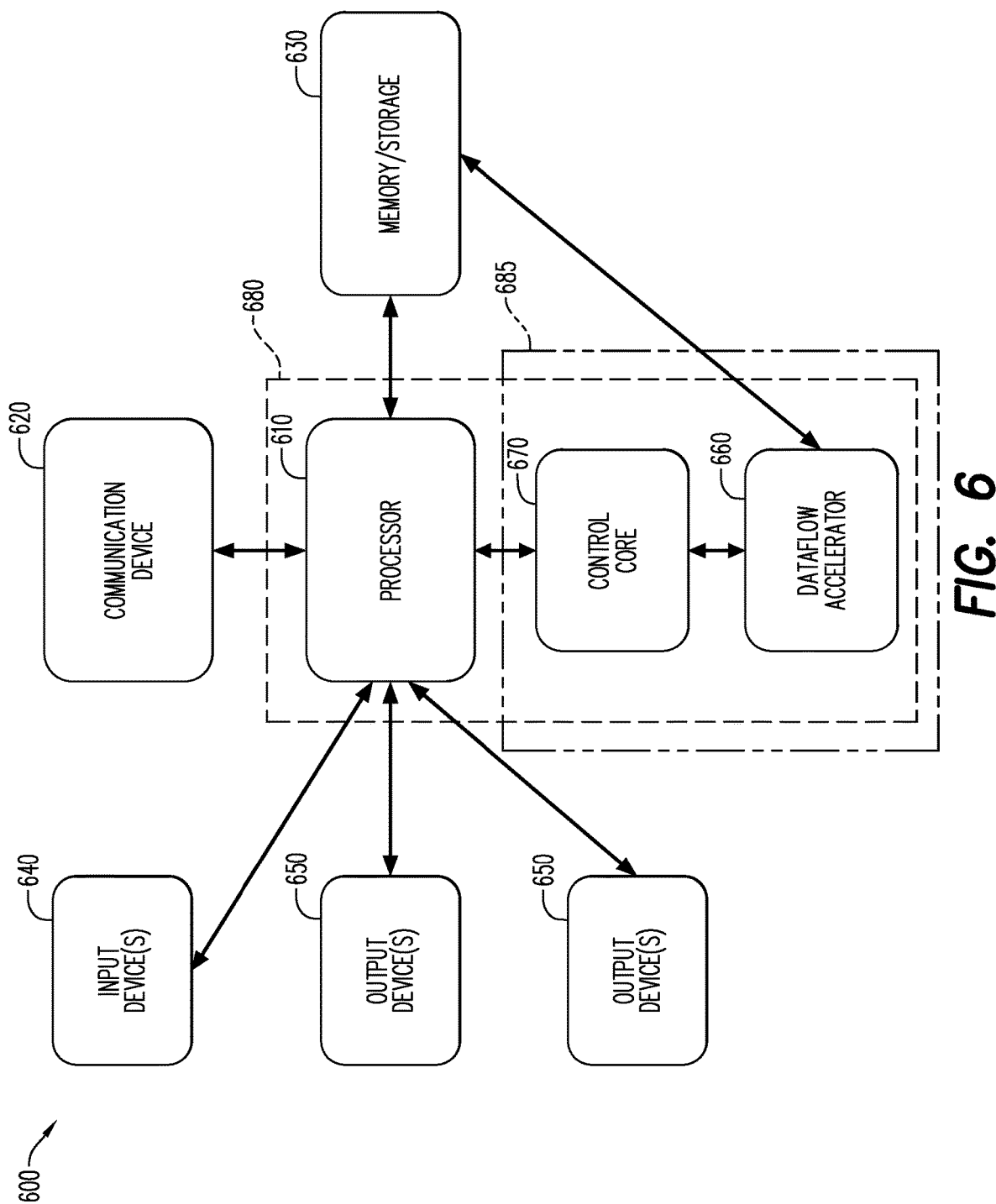
FIG. 6 illustrates a system according to some embodiments.

The stream command dispatcher 130 may be associated with a control/command core (e.g., a processor), such as the processor 610 described with respect to FIG. 6. The stream command dispatcher 130 may be an element of the control core and the stream command dispatcher 130 may transmit commands to any of the stream engines 105, 120, 145. The control core may be based on a Von Neumann instruction set architecture (ISA). The stream commands transmitted by the stream command dispatcher 130 may relate to patterns of memory access such as, but not limited to, contiguous, strided, and indirect memory patterns. In some embodiments, the control core may comprise a Reduced Instruction Set Computer (RISC)-V core.

The CGRA 140 may expose instructions and their dependencies based on the use of a dataflow graph (DFG) where the input vector port interface 135 and the output vector port interface 150 may comprise ports with configurable widths that are the sources and destinations for stream commands. In some embodiments, the ports may be named. The CGRA 140 may be used to implement a DFG by identifying it as part of a source code and mapping it for an optimal use of the hardware.

Physically, the CGRA 140 may comprise a plurality of interconnects 155 and functional units 160. Each interconnect 155 may comprise a switch or a relay that directs data (e.g., data packets) from the input vector port interface 135 to one or more functional units 160. As an example, and as illustrated in FIG. 1, each functional unit 160 may be connected to, or in communication with, at least four interconnects 155.

Interconnects 155 may be programmed to direct a flow of data to a specific functional unit 160 or to a plurality of functional units 160. Each functional unit 160 may comprise a processing unit that is capable of executing arithmetic, logical, and compare instructions. In some embodiments, each functional unit 160 may comprise an execution unit of a central processing unit (CPU). The CGRA 140 may further comprise a plurality of input vector ports 170 and a plurality of output vector ports 165. The input vector ports 170 may receive data from the input vector port interface 135 for processing within the CGRA 140. The output vector ports 165 may receive result data from the CGRA 140 and transmit the result data to the output vector port interface 150. As illustrated in FIG. 1, the CGRA 140 comprises an eight by eight mesh of interconnects 155 and functional units 160. However, any size mesh may be possible.

Figure 2:
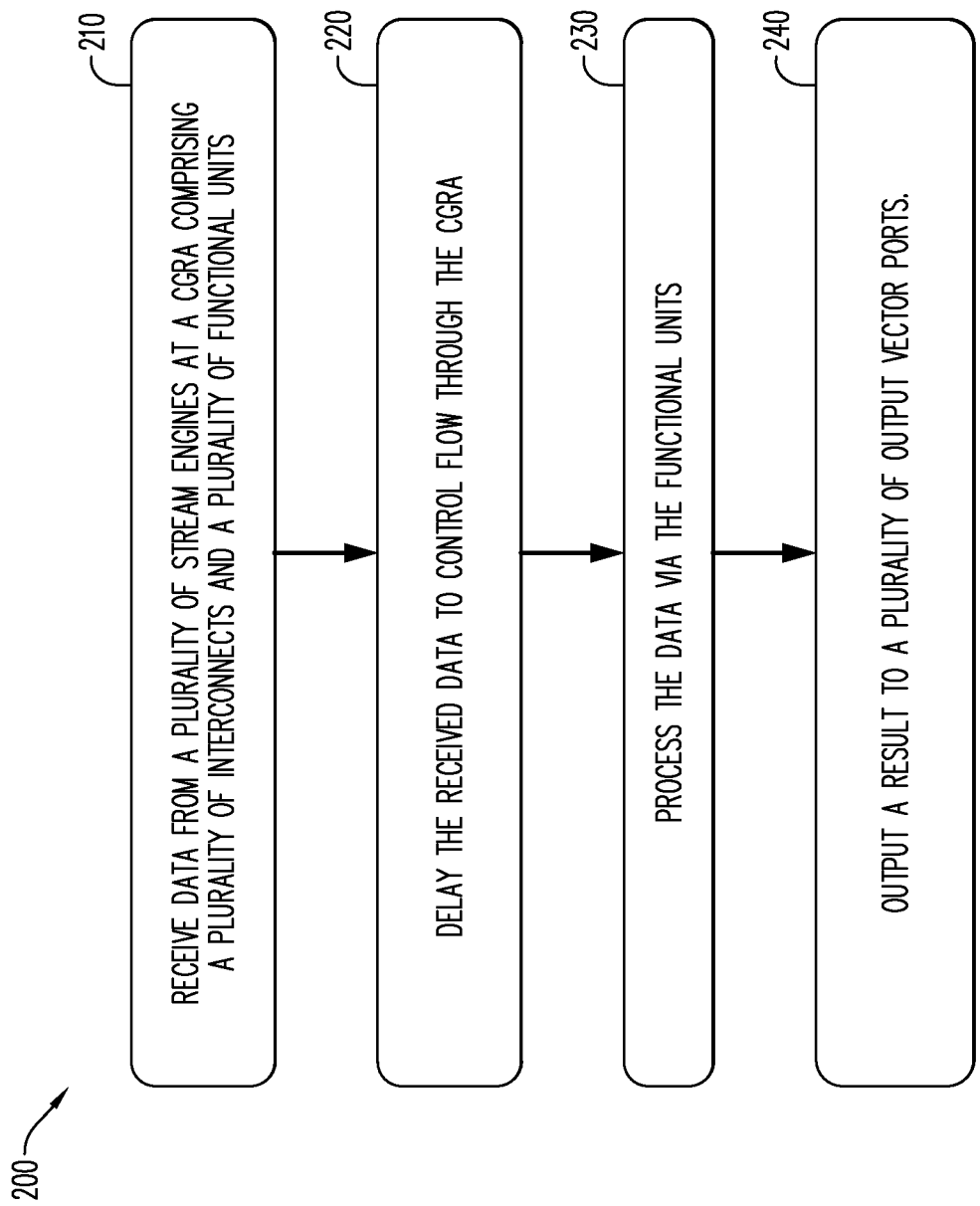
FIG. 2 illustrates a method in accordance with some embodiments.

Now referring to FIG. 2, a method 200 that might be performed by the dataflow accelerator 100, described with respect to FIG. 1, is illustrated according to some embodiments. The exemplary method described with respect to FIG. 2 does not imply a fixed order to the steps, and the same or other embodiments may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 200 may relate to a method of flow control associated with a CGRA. The CGRA may execute instructions (e.g., data) in a pipelined fashion as a DFG describing the computation to be made by the CGRA. In a case that the CGRA is fully pipelined, one instance of the DFG may be executed in a single cycle. Each of the input vector ports and output vector ports, as described with respect to FIG. 1, may be mapped to input and output vertices in the DFG, and a heterogeneous set of functional units may be connected by a plurality of interconnects. The interconnects may be mapped to the vertices and edges of the DFG.

In some embodiments, data may arrive at the input vector ports out of order (e.g., out of sequence) but as soon as enough data for one instance of the dataflow graph is ready, the input ports may send all relevant data to the CGRA at the same time (the same cycle). Data may then flow through the CGRA deterministically with static delays through all paths, essentially treating the CGRA, as a whole, like a deeply pipelined functional unit. Static timing enables the CGRA to forego any flow-control mechanism, which is expensive in hardware.

Figure 7:
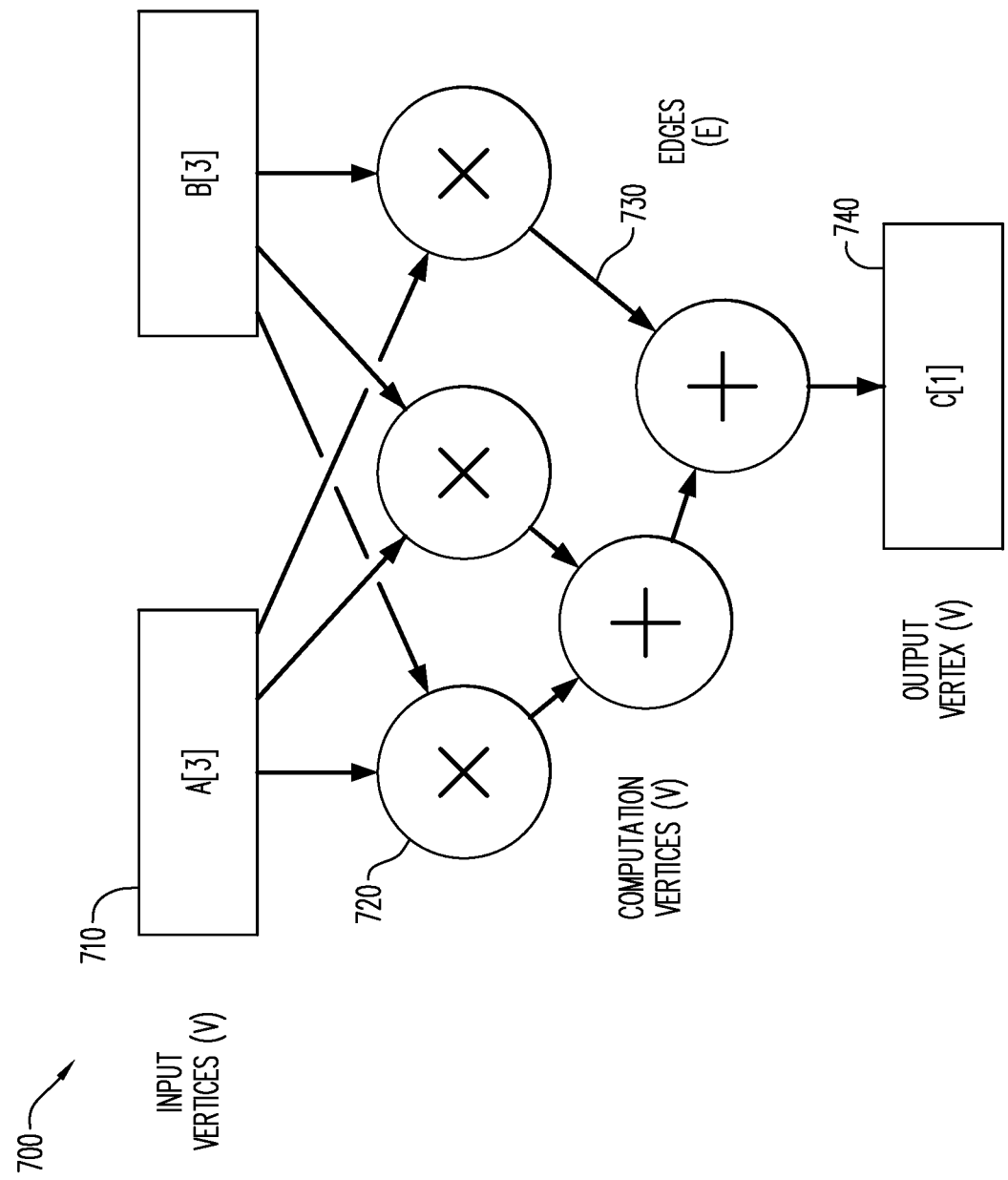
FIG. 7 illustrates a dataflow graph according to some embodiments.

To enable flexibility in timing, the delaying of data sent to one or more functional units 160 may be configured. For example, and referring to FIG. 7, an embodiment of a DFG 700 is illustrated. As illustrated in FIG. 7, input vector ports may be mapped as input vertices 710 which send data through computation vertices 720 and edges 730. Results may then be output at output vertex 740. The creation of delays may be used by a scheduling algorithm to map input, computation, and output vertices to input vector ports, functional units, and output vector ports, respectively. By improving a system's ability to map input, computation and output vertices of the DFG, the CGRA may function more efficiently from a power perspective. Executing a fully-pipelined CGRA, even with the introduction of delays, achieves a greater power efficiency than non-fully pipelined systems by being fully pipelined at a time of execution. Furthermore, the flow control of the CGRA may be designed to minimize a critical path latency from input to output vertices (e.g., vector ports). Minimizing this latency may help performance for several reasons. For example, it may reduce a percentage of time related to pipeline startup and stopping, which is proportional to the dimensions of the CGRA. For short computation phases that need to be processed by the CGRA, the saving of time related to pipeline startup and stopping may be significant. Furthermore, scheduling may reduce latency of recurrences (e.g., a reuse of a value on a subsequent iteration). Thus, in a case where reusing of values frequently occurs, this may improve performance of the CGRA.

For purposes of illustrating features of the present embodiments, some simple examples will now be introduced and referenced throughout the disclosure. These examples are illustrative and are not limiting and are provided purely for explanatory purposes.

Figure 3:
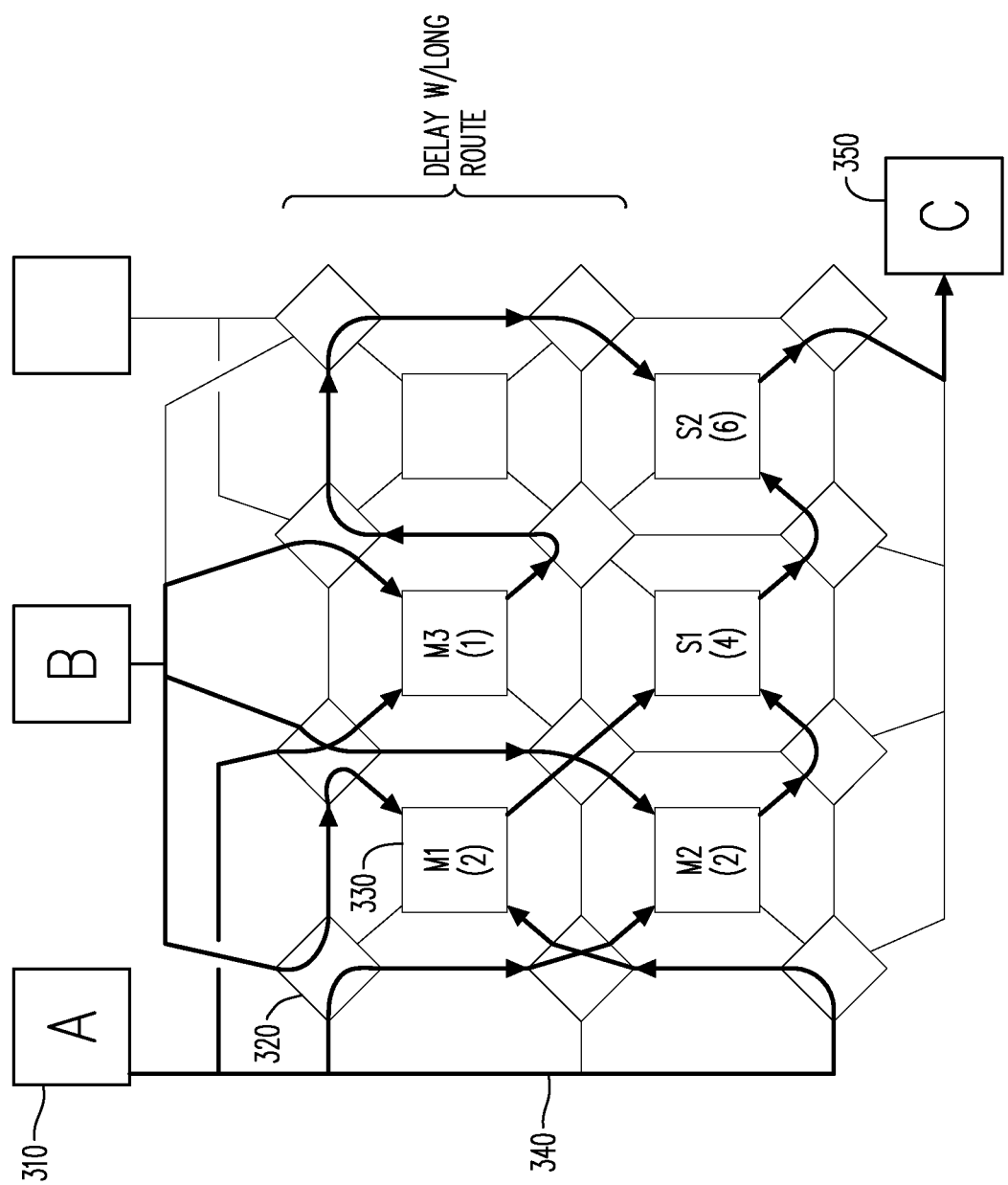
FIG. 3 illustrates a delay associated with a dataflow accelerator in accordance with some embodiments.
Figure 4:
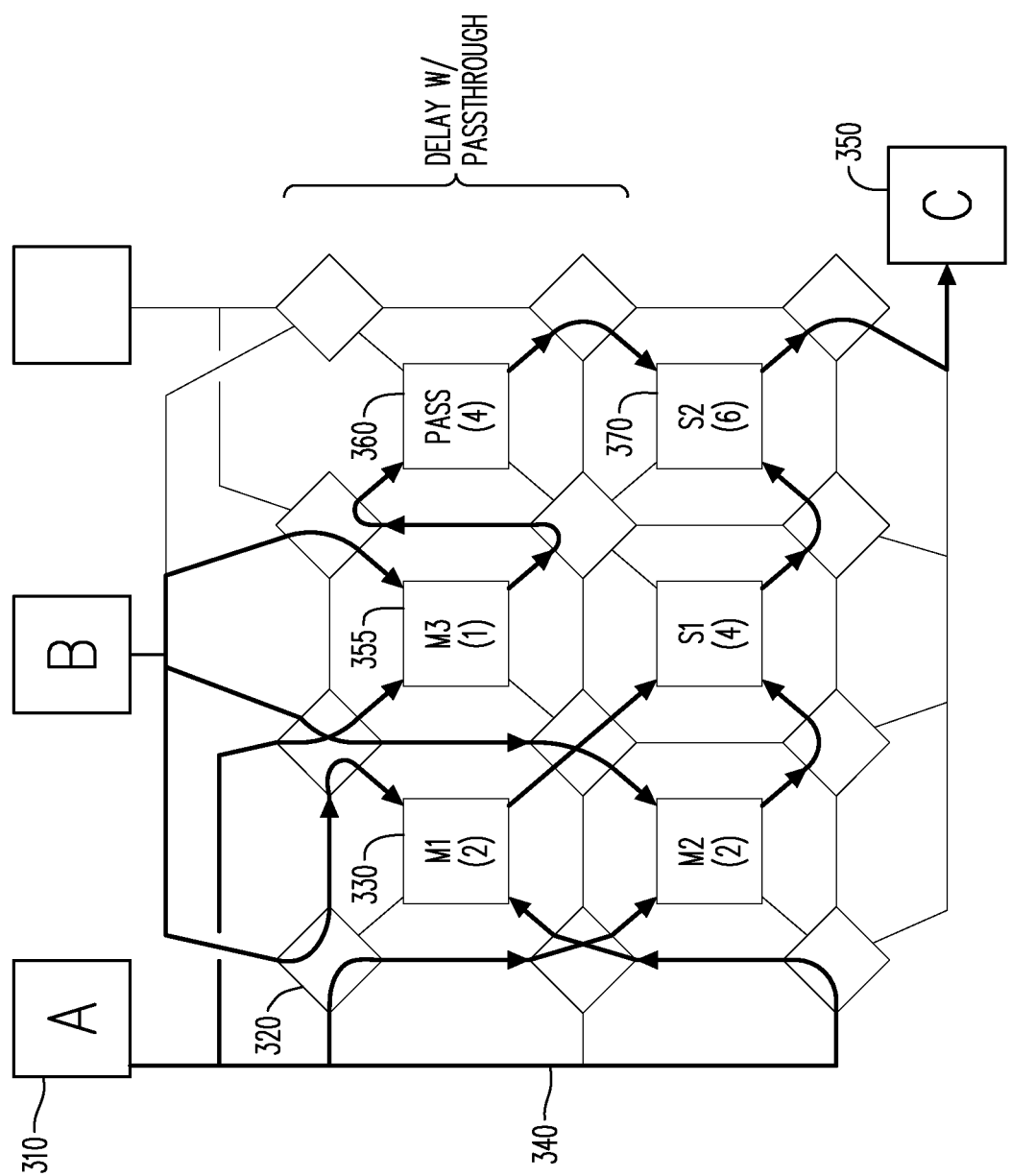
FIG. 4 illustrates a delay associated with a dataflow accelerator in accordance with some embodiments.
Figure 5:
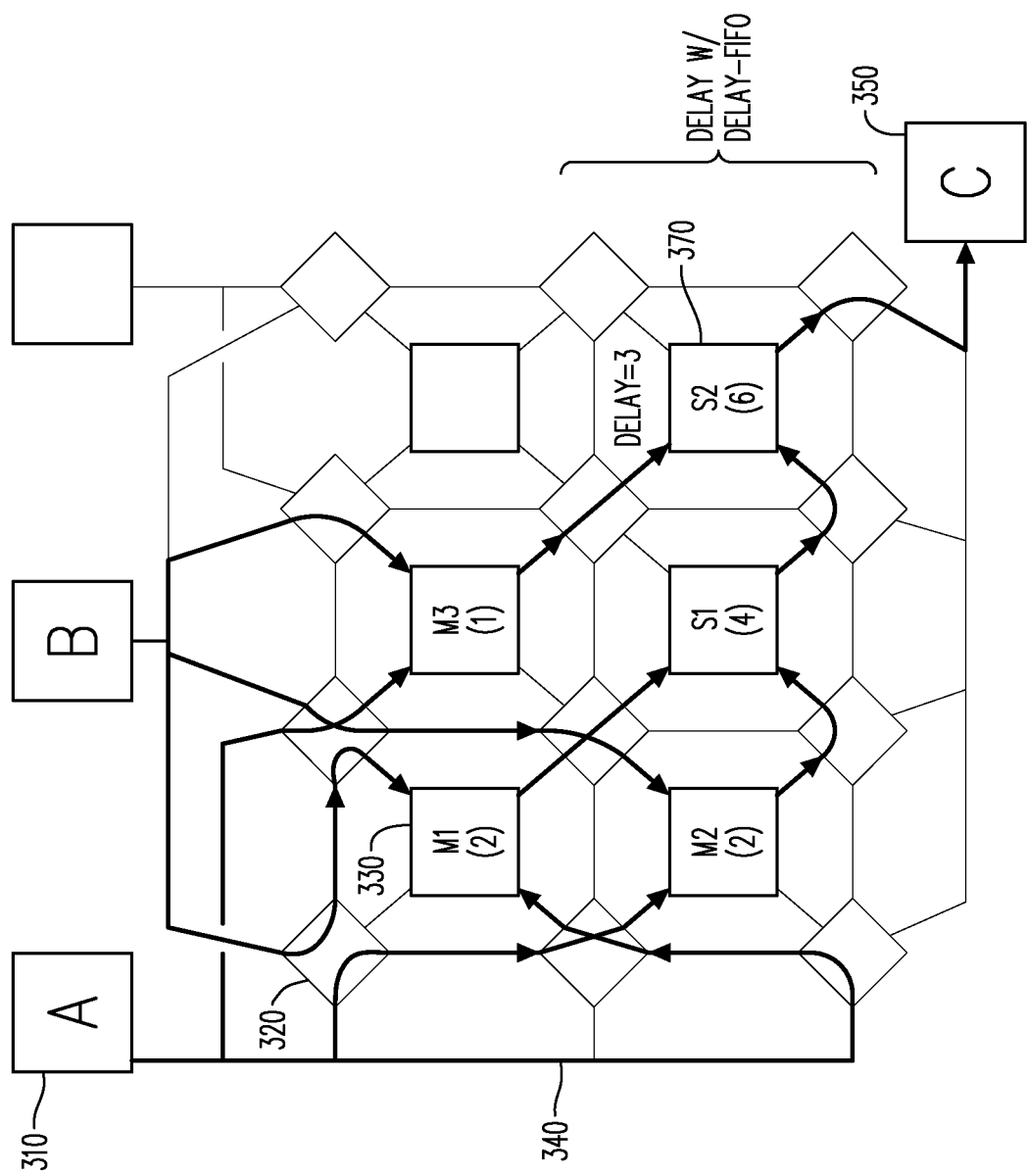
FIG. 5 illustrates a delay associated with a dataflow accelerator in accordance with some embodiments.

Referring now to FIG. 3, FIG. 4, and FIG. 5, exemplary disclosed embodiments of CGRAs are illustrated. Each of FIG. 3, FIG. 4, and FIG. 5 illustrate a plurality of input vector ports 310, a plurality of interconnects 320, a plurality of functional units 330, and at least one output vector port 350. Data sent to the CGRA may be received at the input vector ports 310 from one or more stream engines such as, but not limited to, a scratchpad, a memory stream controller, and/or a recurrence controller.

Referring back to FIG. 2, at 210, data from a plurality of stream engines may be received at a CGRA comprising a plurality of interconnects and a plurality of functional units. At 220, the received data may be delayed for controlling flow through the CGRA. In some embodiments, delaying the data to the one or more functional units may be done outside of the CGRA. For example, data may be stored (e.g., at a router) prior to the data being transmitted to the input vector ports. In another example, data may be stored at the input vector port interface or one or more of a plurality of input vector ports prior to the data being transmitted to one or more functional units. In some embodiments, delaying the data may comprise creating a delay to the one or more functional units as will be described with respect to FIG. 3, FIG. 4 and FIG. 5.

In some embodiments, the delaying the data to the functional units at the CGRA may be based on a scheduling algorithm. The scheduling algorithm may be used to determine when a data packet needs to arrive at a functional unit for processing. In some embodiments, the scheduling algorithm may function as a list-style scheduler by using iterations over a DFG in a topological order. The scheduling algorithm may schedule a vertex for each possible compatible node (e.g., interconnect or functional unit) by determining a shortest path algorithm on each incoming edge of the dataflow graph. A node that requires the fewest links in the routing will be an accepted node, and its routing will be incorporated into a final schedule.

The scheduling algorithm may further map all vertices of the CGRA to a unique and compatible node. This is done to support full pipelining of the CGRA and to avoid having to use time-multiplexing of functional units. For any edge in the CGRA there must exist a connected path of links between where a source and a destination vertex are mapped. In some embodiments, the path of links may be via one or more functional units that may operate as a router. Only one value may be mapped per link to enable full pipelining of the CGRA (e.g., no sharing of resources). Latency of the CGRA may be defined as a cycle offset from the initial sending of data into the CGRA and the latency of each input to a vertex should be identical. This delay estimation may assume one cycle per instruction, and one cycle for each hop through the network.

In this regard, the scheduling algorithm may use a variety of methods to ensure that the delay for each input to a vertex is identical. For example, the scheduling algorithm may select a longer route through the CGRA that a data packet must take by instructing the interconnects to create a longer path. In some embodiments, the scheduling algorithm may also select a functional unit to be used as a pass through which adds a time delay to a data packet at the functional unit since the functional unit must input the data packet and then output the data packet. In some embodiments, the scheduling algorithm may add a delay to an input of a functional unit based on a predetermined delay parameter by placing the data packet into a first-in-first-out data structure. These will be explained in more detail with respect to FIG. 3, FIG. 4 and FIG. 5.

Referring now to FIG. 3, in one example embodiment, a delay may be created by instructing the interconnects 320 to route data through a long path 340 between the input vector port 310 and a functional unit 330. This increased path length, plus the latency associated with an interconnect, may delay a packet's arrival at the functional unit. As illustrated in FIG. 3, data sent from input vector port A may be routed through a long path 340 to arrive at functional unit 330 (M1).

In another example embodiment, and now referring to FIG. 4, a delay may be created by instructing the interconnects 320 to route data through a pass-through functional unit 360 that is situated between the input vector port 310 and a functional unit where the data may be executed. This pass-through functional unit 360 may comprise an inherent latency as data traverses through the pass-through functional unit 360 and as such, the pass-through functional unit 360 may delay a data packet's arrival at a functional unit that will execute the data packet. The inherent latency may be due to packets passing through data structures (e.g., queues, stacks, etc.) that the data packet must traverse between an input to the pass-through functional unit 360 and an output of the pass-through functional unit 360. As illustrated in FIG. 4, data sent from input vector port A may be sent to functional unit 355 and then routed through pass-through functional unit 360 before arriving at functional unit 370 where execution of the data may occur and results may be output to output vector port 350.

In a third example embodiment, and now referring to FIG. 5, a delay may be created by instructing an interconnect 320 or a functional unit 330 to delay a data packet using a data structure. The data structure may comprise a first-in-first-out data structure (e.g., a queue) or any other known first-in-first-out data structure. For example, and as illustrated in FIG. 5, data arriving at functional unit 370 may be placed in a first-in-first-out data structure to delay processing of the data packet at functional unit 370. In some embodiments, an amount of a delay may be based on a position of entry into the first-in-first-out data structure or a length of the first-in-first-out data structure.

In some embodiments, the above three techniques may be used in conjunction to balance delay in the CGRA. Use of first-in-first-out data structures may be expensive in hardware thus making it is desirable to minimize the use of first-in-first-out data structures. Therefore, the scheduling algorithm may utilize a combination of the aforementioned techniques. For example, a delay may use two pass-through functional units while also using a long path through the CGRA. In some embodiments, pass-through functional units may be used for routing data packets through the CGRA thus improving routing by adding to a total amount of available routing bandwidth.

Referring back to FIG. 2, at 230, the data may be processed via the functional units and at 240, a result (e.g., result data) of the processing may be output to a plurality of output vector ports. In some embodiments, when the result reaches the plurality of output vector ports, the result may be latched in a first-in-first-out data structure until one or more of the stream engines moves or stores the result.

Note the embodiments described herein may be implemented using any number of different hardware configurations. For example, FIG. 6 illustrates a computing system 600 that may be, for example, associated with a dataflow accelerator 660 as described with respect to FIG. 1. The computing system 600, with the dataflow accelerator 660, may provide a technical and commercial advantage by being able to accelerate the processing of data thus reducing a load on a processor 610 and being power efficient. Furthermore, the dataflow accelerator 660 may be programmable and, as such, not limited to a single domain.

The computing system 600 may comprise the processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users. The computing system 600 further includes an input device 640 (e.g., a mouse and/or keyboard to enter programming information to be used by the dataflow accelerator) and one or more output devices 650 (e.g., to output and display the data and/or alerts).

The processor 610 also communicates with a memory/storage device 630 that stores data. The storage device 630 may comprise any appropriate information storage device, including combinations of magnetic storage devices (e.g., a hard disk drive), optical storage devices, mobile telephones, and/or semiconductor memory devices. The storage device 630 may store a program and/or processing logic for controlling the processor 610 and/or the dataflow accelerator 660. The processor 610 may perform instructions of the program and thereby operates in accordance with any of the embodiments described herein. The program may be stored in a compiled, compressed, uncompiled and/or encrypted format or a combination. The program may furthermore include other program elements, such as an operating system, a database management system, and/or device drivers used by the processor 610 to interface with peripheral devices. The processor 610 may control the dataflow accelerator 660 via a control core 670. The control core 670 may comprise a limited function processor, such as a RISC type processor, that interfaces with the dataflow accelerator 660. As illustrated in FIG. 6, the processor 610, the control core 670 and the dataflow accelerator 660 may be separate elements. However, in some embodiments, the processor 610, the control core 670 and the dataflow accelerator 660 may be combined as a single element, or chip, as illustrated by dashed line 680. In some embodiments, the control core 670 and the dataflow accelerator 660 may be combined as a single element, or chip, that is separate from the processor 610 as illustrated by dashed line 685.

As used herein, information may be "received" by or "transmitted" to, for example: (i) the computing system 600 from another device; or (ii) a software application or module within the computing system 600 from another software application, module, or any other source.

Referring now to FIG. 8 and FIG. 9, sample code 800/900/910 that may be used to implement the embodiments described herein is illustrated. In particular, sample code 800/900/910 may relate to the implementation of a scheduling algorithm. Sample code 800, as illustrated in FIG. 8, may relate to a list style scheduling algorithm. The sample code 800 may be used for iterating over a DFG in topological order. In some embodiments, sample code 800 may attempt to schedule a vertex of the DFG on each possible compatible node (e.g., the loop starting on line 11 of sample code 800). For example, in the loop starting at line 11, procedure RouteInEdges( ) may call a shortest path algorithm associated with each incoming edge. A node n which requires a fewest number of links in the routing may be the accepted node and its routing may be incorporated into a final schedule. Sample code 900, as illustrated in FIG. 9, may be used to call sample code 800 multiple times and sample code 900 may determine and keep a best schedule determined by sample code 800.

In some embodiments, the code 800 may also randomly prioritize different paths and/or choose an arbitrary compatible node to be used in the schedule rather than a node that minimizes resources (e.g. stochastic decisions). For example, the sample code 800 may iterate in a random topological order to randomly prioritize different paths. These stochastic decisions may be integrated into a scheduling algorithm by calling a stochastic scheduler, an example of which is illustrated in sample code 910.

The present embodiments may be embodied as a system, method or computer program product. Accordingly, the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present embodiments may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

Various adaptations and modifications of the above-described embodiments can be configured without departing from the scope and spirit of the claims. Therefore, it is to be understood that the claims may be practiced other than as specifically described herein.

The present disclosure, in various embodiments, configurations and aspects, includes components, methods, processes, systems and/or apparatus substantially developed as depicted and described herein, including various embodiments, sub-combinations, and subsets thereof. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make substitutions possible that are not now contemplated by reason of the imprecision of language; these variations should be covered by the appended claims. This written description uses examples to disclose the method, machine and computer-readable medium, and also to enable any person of ordinary skill in the art to practice these, including making and using any devices or systems and performing any incorporated methods. The patentable scope thereof is defined by the claims, and may include other examples that occur to those of ordinary skill in the art.

What is claimed:

1. A computer system, comprising:
   a control core;
   a plurality of stream engines operably coupled to the control core; and
   a coarse grain reconfigurable array (CGRA) operably coupled to the control core and the plurality of stream engines,
   wherein the CGRA comprises a plurality of interconnects and a plurality of functional units; and wherein the control core is configured to control a flow of data through the CGRA by instructing an interconnect of the plurality of interconnects or a functional unit of the plurality of functional units to implement a delay so as to equalize arrival times of data packets at a destination functional unit of the plurality of functional units.

2. The computer system of claim 1, further comprising:
a plurality of input vector ports to receive the data from the plurality of stream engines and to transmit the data received from the plurality of stream engines into the CGRA.

3. The computer system of claim 2, further comprising:
a plurality of output vector ports to receive output data from the CGRA, wherein a width of each of the plurality of input vector ports and the plurality of output vector ports is configurable.

4. The computer system of claim 3, wherein the control core is configured to control a flow of data through the CGRA by instructing at least one interconnect of the plurality of interconnects or at least one functional unit of the plurality of functional units to implement a delay so as to equalize arrival times of data packets at an output port.

5. The computer system of claim 2, wherein each functional unit of the plurality of functional units is connected to four interconnects, and the plurality of interconnects is configured for directing the data received from the plurality of stream engines to the functional units.

6. The computer system of claim 5, wherein the functional units are configured for executing arithmetic, logical, and compare instructions.

7. The computer system of claim 1, wherein the plurality of stream engines comprises at least one of a scratchpad, a memory stream controller, and a recurrence controller.

8. The computer system of claim 7, wherein the scratchpad comprises a read controller to transmit scratchpad data to an input vector port interface, and a write controller.

9. The computer system of claim 8, wherein the scratchpad collects and accesses re-used output data received from an output vector port interface.

10. The computer system of claim 1, wherein the instructing an interconnect of the plurality of interconnects or a functional unit of the plurality of functional units to implement a delay comprises one of:
storing data received at a given functional unit of the plurality of functional units in a data structure at the given functional unit,
selecting a path through the CGRA that comprises a pass-through functional unit,
instructing a first interconnect of the plurality of interconnects to delay a data packet, and
selecting a path between a first functional unit of the plurality of functional units and a second functional unit of the plurality of functional units that is longer than a shortest path between the first functional unit and the second functional unit, the shortest path being a path that traverses a least amount of interconnects of the plurality of interconnects.

11. The computer system of claim 10, wherein the data structure is a first in first out (FIFO) data structure.

12. The computer system of claim 1, wherein the delay is configurable by the control core.

13. The computer system of claim 1, wherein:
the control core is configured to obtain a schedule for the flow of the data through the CGRA; and
the control core is configured to control the flow of the data through the CGRA based on the schedule.

14. A method of flow control through a coarse grain reconfigurable array (CGRA), the method comprising:
obtaining a schedule for a flow of data through a coarse grain reconfigurable array (CGRA);
providing a system comprising:
a control core;
a plurality of stream engines operably coupled to the control core; and
the CGRA, the CGRA being operably coupled to the control core and the plurality of stream engines, and comprising a plurality of interconnects and a plurality of functional units; and
controlling the flow of the data through the CGRA by instructing an interconnect of the plurality of interconnects or a functional unit of the plurality of functional units to implement a delay based on the schedule so as to equalize arrival times of data packets at a destination functional unit of the plurality of functional units.

15. The method of claim 14, further comprising receiving the data at the CGRA from the plurality of stream engines, which comprises receiving the data from the plurality of stream engines at a plurality of input vector ports and transmitting the data from the plurality of stream engines from the plurality of input vector ports to a first functional unit of the plurality of functional units of the CGRA.

16. The method of claim 14, further comprising executing, with the plurality of functional units within the CGRA, arithmetic, logical, and compare instructions.

17. The method of claim 14, wherein the instructing an interconnect of the plurality of interconnects or a functional unit of the plurality of functional units to implement a delay based on the schedule comprises one of:
storing data received at a given functional unit of the plurality of functional units in a data structure at the given functional unit,
selecting a path through the CGRA that comprises a pass-through functional unit,
instructing a first interconnect of the plurality of interconnects to delay a data packet, and
selecting a path between a first functional unit of the plurality of functional units and a second functional unit of the plurality of functional units that is longer than a shortest path between the first functional unit and the second functional unit, the shortest path being a path that traverses a least amount of interconnects of the plurality of interconnects.

18. A non-transitory computer-readable medium comprising processor executable instructions that, when executed by a processor, perform a method of flow control through a coarse grain reconfigurable array (CGRA) comprising a plurality of interconnects and a plurality of functional units, the method of flow control comprising:
obtaining a schedule for a flow of data through the CGRA; and
controlling the flow of the data through the CGRA by instructing an interconnect of the plurality of interconnects or a functional unit of the plurality of functional units to implement a delay based on the schedule so as to equalize arrival times of data packets at a destination functional unit of the plurality of functional units.

19. The non-transitory computer-readable medium of claim 18, wherein the instructing an interconnect of the plurality of interconnects or a functional unit of the plurality of functional units to implement a delay based on the schedule comprises one of:

storing data received at a given functional unit of the plurality of functional units in a data structure at the given functional unit, selecting a path through the CGRA that comprises a pass-through functional unit, instructing a first interconnect of the plurality of interconnects to delay a data packet, and selecting a path between a first functional unit of the plurality of functional units and a second functional unit of the plurality of functional units that is longer than a shortest path between the first functional unit and the second functional unit, the shortest path being a path that traverses a least amount of interconnects of the plurality of interconnects.

* * * * *